(12) United States Patent
Kunert et al.

(10) Patent No.: US 7,665,751 B2
(45) Date of Patent: Feb. 23, 2010

(54) TRANSVERSE OR OBLIQUE LINK

(75) Inventors: Reinhard Kunert, Weissach (DE); Norbert Schote, Ammerbuch (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 160 days.

(21) Appl. No.: 11/935,067

(22) Filed: Nov. 5, 2007

(65) Prior Publication Data
US 2009/0066049 A1 Mar. 12, 2009

(30) Foreign Application Priority Data
Nov. 10, 2006 (DE) .................. 10 2006 053 030

(51) Int. Cl.
*B60G 7/00* (2006.01)
(52) U.S. Cl. .................. 280/124.134; 280/124.135; 280/124.136
(58) Field of Classification Search .......... 280/124.134, 280/124.135, 124.136
See application file for complete search history.

(56) References Cited

U.S. PATENT DOCUMENTS

| | | | | |
|---|---|---|---|---|
| 5,322,317 | A | * | 6/1994 | Kusaka et al. .......... 280/124.134 |
| 5,362,090 | A | * | 11/1994 | Takeuchi .............. 280/124.152 |
| 5,516,130 | A | * | 5/1996 | Mitchell .............. 280/124.134 |
| 5,607,177 | A | | 3/1997 | Kato |
| 5,845,938 | A | * | 12/1998 | Kato ........................ 280/784 |
| 5,992,867 | A | * | 11/1999 | Kato et al. ............ 280/124.134 |
| 6,572,126 | B2 | * | 6/2003 | Tunzini ................ 280/124.134 |
| 6,705,627 | B2 | * | 3/2004 | Hasebe et al. .......... 280/124.134 |
| 6,719,314 | B1 | | 4/2004 | Schote |
| 6,905,129 | B2 | * | 6/2005 | Runte et al. ........... 280/124.134 |
| 7,364,176 | B2 | * | 4/2008 | Saitoh et al. ............ 280/124.13 |
| 2002/0005621 | A1 | * | 1/2002 | Christophliemke et al. ...... 280/124.134 |
| 2003/0034624 | A1 | | 2/2003 | Schmidt et al. |
| 2005/0104315 | A1 | * | 5/2005 | Howell et al. .......... 280/124.134 |

FOREIGN PATENT DOCUMENTS

| | | |
|---|---|---|
| DE | 2454155 A1 | 5/1976 |
| DE | 19522916 A1 | 1/1996 |
| DE | 10338625 A1 | 3/2005 |
| FR | 2710583 A1 | 4/1995 |
| JP | 2038119 A | 2/1990 |

OTHER PUBLICATIONS

European Search Report dated Sep. 25, 2008.

* cited by examiner

*Primary Examiner*—Toan C To

(57) ABSTRACT

A transverse or oblique link is provided for a front vehicle axle. The link contains a first and a second link arm, the first link arm has a deformation section situated at a front in the direction of travel and a section situated behind it in the direction of travel. Furthermore, the first link arm is configured in such a manner that, in an accident, it is deformed in an energy-absorbing manner predominantly in its deformation section. In order to force a deformation in the deformation section, the flexural rigidity of the section about a bending axis running in the transverse direction of the vehicle is increased in comparison to the flexural rigidity of the deformation section. Upon contact with a curb, the two sections can be deformed in an energy-absorbing manner.

18 Claims, 2 Drawing Sheets

TRANSVERSE OR OBLIQUE LINK

CROSS-REFERENCE TO RELATED APPLICATION

This application claims the priority, under 35 U.S.C. § 119, of German application DE 10 2006 053 030.6, filed Nov. 10, 2006; the prior application is herewith incorporated by reference in its entirety.

BACKGROUND OF THE INVENTION

Field of the Invention

The invention relates to a transverse or oblique link for a front vehicle axle. The link is formed of a first link arm, which is configured such that it is curved between a front and a rear articulation point on the chassis, and a second link arm, which runs between the rear articulation point on the chassis and an articulation point on the wheel. The first link arm is configured in such a manner that it is deformed in an energy-absorbing manner in a crash. The invention also relates to a vehicle equipped with a transverse or oblique link of this type.

A transverse or oblique link of the type in question is known from published, non-prosecuted German patent application DE 103 38 625 A1, wherein the transverse or oblique link mounts the wheels of the vehicle on wheel carriers in an articulated manner and wherein at least one link arm running between two articulation points situated on the vehicle body at least approximately one behind the other in the direction of travel is configured such that it is curved or arcuate. The link has an arcuate section over at least two thirds of a distance between the two articulation points. By this measure, an individual wheel suspension system is to be realized which, in the event of an accident, assists, without blocking, a crash process by consuming impact energy.

In the case of accidents, such as, for example, a frontal impact, a great safety risk for vehicle occupants relates in that a vehicle chassis forms a block and thereby obstructs an energy-consuming crumpling of a front end of the vehicle in the region of the chassis connection. In this case, the stiff chassis parts form the abovementioned block together with the link connections, the block only being able to be deformed to a small extent and often presses as a whole onto an end wall of the passenger cell. As a result of this, not enough impact energy is dissipated and, in addition, the chassis is pressed against the foot well of the passenger cell, and there can therefore be an increased risk of injury in particular in this region.

BRIEF SUMMARY OF THE INVENTION

It is accordingly an object of the invention to provide a transverse or oblique link which overcomes the above-mentioned disadvantages of the prior art devices of this general type, which, in particular when a predefined force is exceeded, can be compressed in an energy-absorbing manner.

With the foregoing and other objects in view there is provided, in accordance with the invention a link, such as a transverse link or an oblique link, for a front vehicle axle. The link contains a first link arm having a front articulation point and a rear articulation point for a chassis. The first link arm is curved between the front and rear articulation points. The first link arm is configured to deform in an energy-absorbing manner in a crash. The first link arm has a deformation section situated at a front in a direction of travel and a stiffer section situated behind the deformation section in the direction of travel. The first link arm is configured such that, in a frontal crash in a longitudinal direction of the vehicle, the first link arm deforms in an energy-absorbing manner predominantly in the deformation section. The stiffer section has a flexural rigidity about a bending axis running in a transverse direction of the vehicle and increases in comparison to a flexural rigidity of the deformation section. A second link arm is provided and has a further articulation point for a wheel chassis. The second link arm runs between the rear articulation point and the further articulation point.

The invention is based on the general concept of providing a first link arm of a transverse or oblique link, which has two link arm parts, with sections of differing stiffness, in particular in a longitudinal direction of the vehicle, as a result of which, in the event of a crash, a predefined and energy-absorbing bending can be enforced. In this case, the first link arm is configured such that it is curved between a front and a rear articulation point on the chassis while the second link arm runs in a curved manner between the rear articulation point and an articulation point on the wheel. For the bending which absorbs impact energy, the first link arm has a deformation section situated in front in the direction of travel and a stiffer section situated behind it in the direction of travel, the first link arm bending virtually exclusively in its deformation section, i.e. being deformed in an energy-absorbing manner, in the event of a crash. As the name already indicates, the rigidity, in particular the flexural rigidity about a bending axis running in the transverse direction of the vehicle, is significantly higher in the case of the section than in the case of the deformation section of the first link arm. By this configuration according to the invention of the first link arm in sections, a precisely defined bending of the first link arm in the event of a crash in the longitudinal direction of the vehicle or if misuse load situations occur can be enforced, thus making it possible to significantly reduce the risk of injury to passengers in the passenger compartment, since the transverse or oblique support which hitherto had a blocking tendency now acts as a deformation element absorbing impact energy. In the event of a loading acting transversely on the wheel, the side sections can be deformed.

In an advantageous development of the solution according to the invention, the first link arm of the transverse or oblique link has an H-shaped profile in its section. A profile of this type, customarily also referred to as an I profile, has a particularly high flexural rigidity because of the webs disposed on the edge, as a result of which the first link arm is very stiff in this region. However, in comparison to a solid profile, the H profile according to the invention can not only increase the flexural rigidity but, in addition, can also reduce the weight of the transverse or oblique link, which is of great importance in particular in the manufacturing of sports cars.

The deformation section of the first link arm expediently merges continuously, i.e. without a step, into the section of the first link arm. This brings about a particularly good force flux, with it being possible, by the continuous transition, in particular to avoid force or stress peaks, such as may occur, for example, in the case of sharp material or cross-sectional discontinuities.

In a further advantageous embodiment of the solution according to the invention, the section of the first link arm tapers in the direction of travel. Therefore the rear end region of the first link arm has very high rigidity in comparison to its front end region, the rigidity decreasing increasingly in the direction of travel, i.e. in the direction of the deformation section. Since the high degree of rigidity which is desirable in the rear section is no longer desirable in the front section, i.e. in the region of the deformation section, the shaping formed in this way of the first link arm provides the desired decreasing rigidity from the section to the deformation section.

It goes without saying that the features mentioned above and those which have yet to be explained below can be used not only in the respectively stated combination but also in different combinations or on their own without departing from the context of the present invention.

Other features which are considered as characteristic for the invention are set forth in the appended claims.

Although the invention is illustrated and described herein as embodied in a transverse or oblique link, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
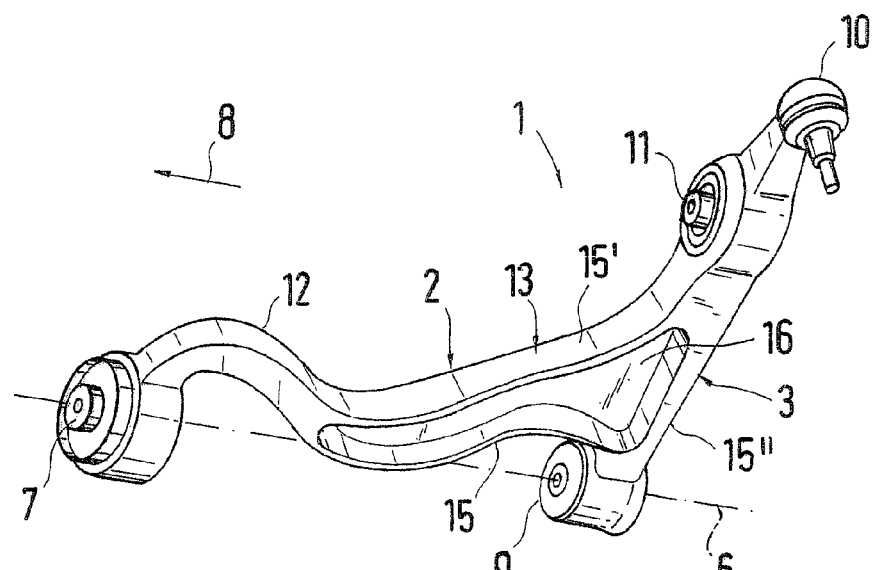
FIG. 1 is a diagrammatic, perspective view of a transverse or oblique link according to the invention.

Referring now to the figures of the drawing in detail and first, particularly, to FIG. 1 thereof, there is shown a transverse or oblique link 1 according to the invention which has a first link arm 2 and a second link arm 3. The transverse or oblique link 1 is disposed in a known manner on a front vehicle axle (see FIGS. 2 and 3) and is connected firstly to a motor vehicle body 4 in an articulated manner and secondly to a steering lever 5 in an articulated manner. In contrast to a suspension strut dome which absorbs vertical forces of the vehicle, the transverse or oblique link 1 absorbs horizontal forces occurring during accelerating, braking and cornering. The transverse or oblique link 1 can be pivoted about an axis 6, the axis 6 running generally through a front articulation point 7 on the chassis and through an articulation point 9 which is situated behind it in the direction of travel 8 and is on the chassis. During braking of the vehicle, the front articulation point 7 is therefore loaded in tension and the rear articulation point is loaded in compression. The first arm 2 is configured such that it is curved between the front articulation point 7 and the rear articulation point 9.

By contrast, the second link arm 3 runs from the rear articulation point 9 on the chassis to an articulation point 10 on the wheel, which articulation point is connected in an articulated manner to a non-illustrated wheel bearing. Between the rear articulation point 9 and the articulation point 10 on the wheel, a further articulation point 11, to which, for example, a non-illustrated spring and shock absorber strut can be connected in an articulated manner, is provided on the second link arm 3. In one particular refinement of the transverse or oblique link 1 according to the invention, the three articulation points 7, 9 and 10 and also the first and second link arms 2, 3 can be situated on a plane. According to the illustrations in FIGS. 1 to 3, the first link arm 2 leads in the region between the rear articulation point 9 on the chassis and the further articulation point 11 into the second link arm 3.

Figure 2:
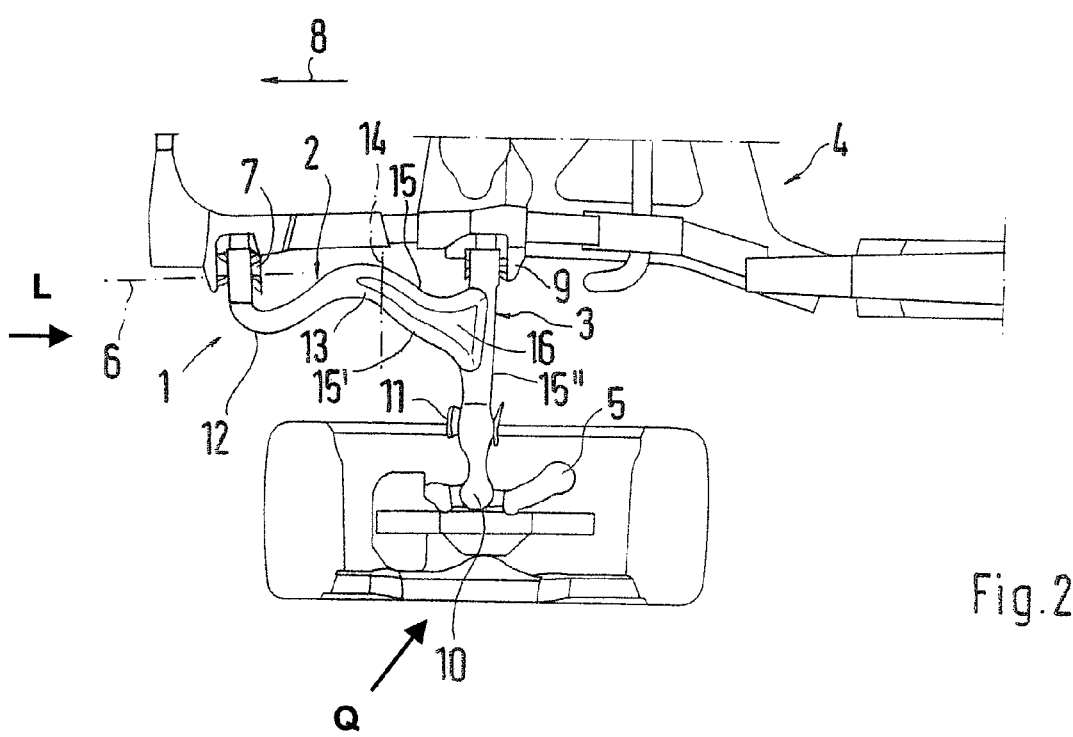
FIG. 2 is a diagrammatic, front view of the transverse or oblique link in a fitted position.
Figure 3:
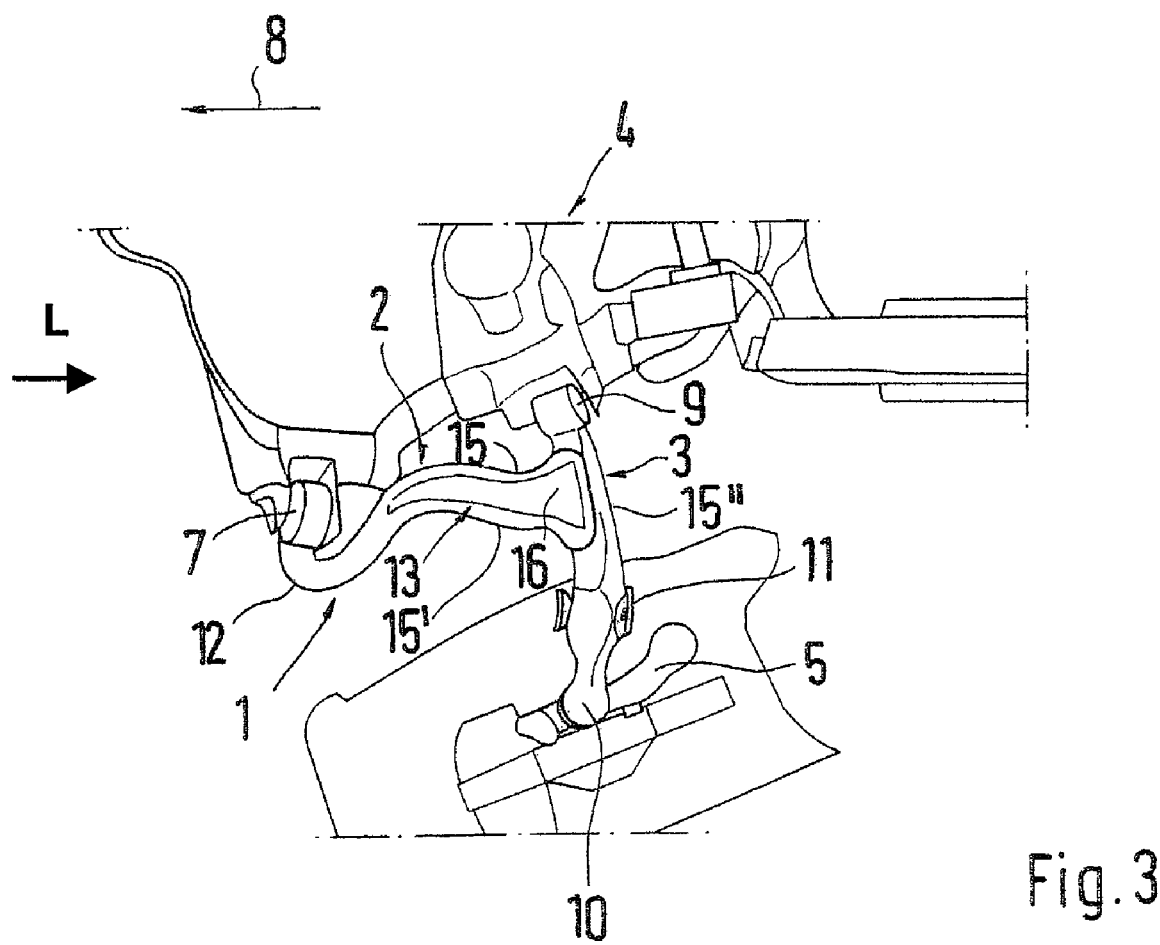
FIG. 3 is a diagrammatic, front view as in FIG. 2, but with the transverse or oblique link deformed by a misuse load.

As can be gathered from FIGS. 1 to 3, the first link arm 2 has a deformation section 12 situated in front in the direction of travel 8 and a stiffer section 13 situated behind it in the direction of travel 8. In this case, a flexural rigidity of the section 13, in particular about a bending axis 14 running in the transverse direction of the vehicle, is significantly increased in comparison to the flexural rigidity of the deformation section 12. The increase is brought about by webs 15 and 15' which are disposed on the edge of the first link arm 2 and increase a moment of resistance of the first link arm 2 in the section 13. The webs 15 and 15' which are disposed on the edge give the section 13 of the first link arm 2 an H-shaped profile, also called I profile for short.

According to the invention, in the case of a misuse load, for example in the case of a frontal impact counter to the direction of travel 8, the first link arm 2 can be deformed in its deformation section 12 in a manner absorbing impact energy, as a result of which blocking of the chassis together with the associated risks of injury can be prevented. In FIG. 2, the transverse or oblique link 1 is shown in its normal fitted position while it is shown in FIG. 3 in a deformed state after the occurrence of the misuse load, for example an accident. In contrast to the section 13, the deformation section 12 of the first link arm 2 can be configured as a solid profile, as a result of which it is significantly less flexurally rigid and therefore, when a misuse load occurs, deformation of the first link arm 2 in the deformation section 12 is enforced.

If the first link arm 2 of the transverse or oblique link 1 is viewed, then it is noticeable that the deformation section 12 merges continuously, i.e. without a step, into the section 13, which has a particularly positive effect on a possible force flux in the section 13, since the latter is not greatly deflected due to, for example, cross-sectional discontinuities which are provided. It is also noticeable that the section 13 tapers in the direction of travel 8 and the deformation section 12 of the first link arm 2 has a cross-sectional profile which is small and therefore flexurally soft in comparison to the section 13. In its region situated at the rear in the direction of travel, the section 13 widens toward the rear articulation point 9 on the chassis and toward the further articulation point 11, thus producing a type of delta 16 which likewise permits particularly good introduction of force from the first link arm 2 into the second link arm 3. The delta 16 is generally bordered by the webs 15 and 15' of the first link arm 2 and by a web 15" along the second link arm 3, as a result of which the region in which the first link arm 2 leads into the second link arm 3 can be configured to be particularly stiff. In this case, the central region of the second link arm 3 can form part of the section 13 of the first link arm 2. Furthermore, the bending which is enforced in the deformation section 12 when a misuse load occurs is assisted in that the deformation section 12 leads generally radially to the axis 6 of the front articulation point 7. The radial leading of the deformation section 12 into the front articulation point 7 together with the generally W-shaped profile of the first link arm 2 between the front and the rear articulation points 7 and 9 on the chassis further assist the deformation capability.

In the case of accidents with a frontal impact, in particular chassis parts which are neutral to deformation, such as, for example, a transverse link which can be difficult to deform, constitute safety risks, since such chassis components have a blocking tendency and do not contribute to mitigating the impact by a corresponding deformation which absorbs impact energy. In addition, such chassis components which are not capable of or compliant to deformation can be displaced as a whole in the direction of a foot well of the passenger cell of the vehicle, as a result of which, during an accident, they can press on an end wall (not shown) of the foot well of the passenger cell and, under some circumstances, can cause injuries to the individuals sitting in the passenger compartment. For this reason, it is important that the chassis parts, such as, for example, the transverse or oblique link 1, are also deformed in a manner absorbing impact energy in the case of an accident. The invention therefore proposes to configure the first link arm 2 of the transverse or oblique link 1 with a relatively stiff section 13 and a flexurally soft deformation section 12 situated in front of it in the direction of travel 8. In the case of an impact of the motor vehicle against an obstacle, in particular in the case of a frontal impact or a "mounting" of the curb, the first arm 2 can be deformed at least in its deformation section 12 in a manner absorbing impact energy, with it also being possible for the second link arm 3 to be deformed in an energy-absorbing manner because of the stiff connection of the first link arm 2 via its section 13 to said second link arm 3.

In the case of contact with the curb by the wheel, i.e. in the case of a loading obliquely on the wheel, for example in the arrow direction Q, both sections 12 and 13 can be deformed in an energy-absorbing manner.

The invention claimed is:

1. A link, selected from the group consisting of a transverse link and an oblique link, for a front vehicle axle, the link comprising:
   a first link arm having a front articulation point and a rear articulation point for a chassis, said first link arm being curved between said front and rear articulation points, said first link arm configured to deform in an energy-absorbing manner in a crash, said first link arm having a deformation section situated at a front in a direction of travel and a stiffer section situated behind said deformation section in the direction of travel, said first link arm configured such that, in a frontal crash in a longitudinal direction of the vehicle, said first link arm deforming in an energy-absorbing manner predominantly in said deformation section, and said stiffer section having a flexural rigidity about a bending axis running in a transverse direction of the vehicle and increases in comparison to a flexural rigidity of said deformation section;
   a second link arm having a further articulation point for a wheel chassis, said second link arm running between said rear articulation point and said further articulation point; and
   said deformation section of said first link arm widens toward said rear articulation point and toward said further articulation point and leads into said further articulation point.

2. The link according to claim 1, wherein said stiffer section has an H-shaped profile.

3. The link according to claim 2, wherein said deformation section has a solid profile.

4. The link according to claim 1, wherein said deformation section merges continuously, without a step, into said stiffer section.

5. The link according to claim 1, wherein said front, rear and further articulation points and said first and second link arms are situated on a plane.

6. The link according to claim 1, wherein said stiffer section tapers in the direction of travel.

7. The link according to claim 1, wherein said first link arm has a W-shaped profile between said front and the rear articulation points.

8. The link according to claim 1, wherein said second link arm has at least a central region forming a part of said stiffer section of said first link arm.

9. A link, selected from the group consisting of a transverse link and an oblique link, for a front vehicle axle, the link comprising:
   a first link arm having a front articulation point and a rear articulation point for a chassis, said first link arm being curved between said front and rear articulation points, said first link arm deforming in an energy-absorbing manner in a crash, said first link arm having a deformation section situated at a front in a direction of travel and a stiffer section situated behind said deformation section in the direction of travel, said first link arm configured such that, if a wheel is subjected to an oblique loading from an outside in an arrow direction Q, said first link arm deforming in an energy-absorbing manner in said deformation section and said stiffer section;
   a second link arm having a further articulation point for a wheel chassis, said second link arm running between said rear articulation point and said further articulation point; and
   said deformation section of said first link arm widens toward said rear articulation point and toward said further articulation point and leads into said further articulation point.

10. The link according to claim 9, wherein said stiffer section has an H-shaped profile.

11. The link according to claim 10, wherein said deformation section has a solid profile.

12. The link according to claim 9, wherein said deformation section merges continuously, without a step, into said stiffer section.

13. The link according to claim 9, wherein said front, rear and further articulation points and said first and second link arms are situated on a plane.

14. The link according to claim 9, wherein said stiffer section tapers in the direction of travel.

15. The link according to claim 9, wherein said first link arm has a W-shaped profile between said front and rear articulation points.

16. The link according to claim 9, wherein said second link arm has at least a central region forming a part of said stiffer section of said first link arm.

17. A motor vehicle, comprising:
   a link, selected from the group consisting of a transverse link and an oblique link, for a front vehicle axle, said link containing:
   a first link arm having a front articulation point and a rear articulation point for a chassis, said first arm being curved between said front and said rear articulation points, said first link arm configured to deform in an energy-absorbing manner in a crash, said first link arm having a deformation section situated at a front in a direction of travel and a stiffer section situated behind said deformation section in the direction of travel, said first link arm configured such that, in a frontal crash in a longitudinal direction of the vehicle, said first link arm deforming in an energy-absorbing manner predominantly in said deformation section, and said stiffer section having a flexural rigidity about a bending axis running in a transverse direction of the vehicle and increases in comparison to a flexural rigidity of said deformation section;

a second link arm defining a further articulation point for a wheel chassis, said second link arm running between said rear articulation point and said further articulation point; and said deformation section of said first link arm widens toward said rear articulation point and toward said further articulation point and leads into said further articulation point.

18. A motor vehicle, comprising:

a link, selected from the group consisting of a transverse link and an oblique link, for a front vehicle axle, said link containing:

a first link arm having a front articulation point and a rear articulation point for a chassis, said first link arm being curved between said front and said rear articulation point, said first link arm deforming in an energy-absorbing manner in a crash, said first link arm having a deformation section situated at a front in a direction of travel and a stiffer section situated behind said deformation section in the direction of travel, said first link arm configured such that, if a wheel is subjected to an oblique loading from an outside in an arrow direction Q, said first link arm deforming in an energy-absorbing manner in said deformation section and said stiffer section;

a second link arm defining a further articulation point for a wheel chassis, said second link arm running between said rear articulation point and said further articulation point; and said deformation section of said first link arm widens toward said rear articulation point and toward said further articulation point and leads into said further articulation point.

* * * * *